United States Patent
Filpi et al.

(10) Patent No.: US 9,430,731 B2
(45) Date of Patent: Aug. 30, 2016

(54) IC CARD

(71) Applicant: STMICROELECTRONICS S.R.L., Agrate Brianza (MB) (IT)

(72) Inventors: Giuliano Filpi, Caserta (IT); Antonio Sismundo, Naples (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/640,215

(22) Filed: Mar. 6, 2015

(65) Prior Publication Data
US 2015/0310326 A1    Oct. 29, 2015

(30) Foreign Application Priority Data
Apr. 23, 2014   (IT) .............................. MI2014A0762

(51) Int. Cl.
*G06K 19/06*  (2006.01)
*G06K 19/077*  (2006.01)

(52) U.S. Cl.
CPC ............... *G06K 19/07739* (2013.01)

(58) Field of Classification Search
CPC .................. G06K 19/077; G06K 19/07739; G06K 19/083
USPC ........................................ 235/492
See application file for complete search history.

(56) References Cited

U.S. PATENT DOCUMENTS 5,936,227 A * 8/1999 Truggelmann ....... G06K 19/077
                                                          235/487
2011/0240825 A1    10/2011 Bosquet et al.

OTHER PUBLICATIONS

Rankl et al: "Kartenformate": Handbuch der Chipkarten; Dec. 31, 2008. Hanser. DE. XP055157700. ISBN: 978-3-44-640402-1: pp. 32-39. No Abstract Available).

* cited by examiner

*Primary Examiner* — Jamara Franklin
(74) *Attorney, Agent, or Firm* — Allen, Dyer, Doppelt, Milbrath & Gilchrist, P.A.

(57) ABSTRACT

An integrated circuit card includes a substrate and an integrated circuit carried by the substrate. A first sector is delimited by a first weakening line on the substrate, with the first sector being able to be separated from the substrate. A second sector is delimited by a second weakening line inside the first sector, with the second sector being able to be separated from the substrate and having the integrated circuit thereon. A disposable frame-piece is defined between the first and second weakening lines of the first and second sectors, and has a ring form. A breakage lug is arranged with respect to the disposable frame-piece to break the disposable frame-piece so that it is no longer intact, during separation of the second sector from the substrate.

22 Claims, 3 Drawing Sheets

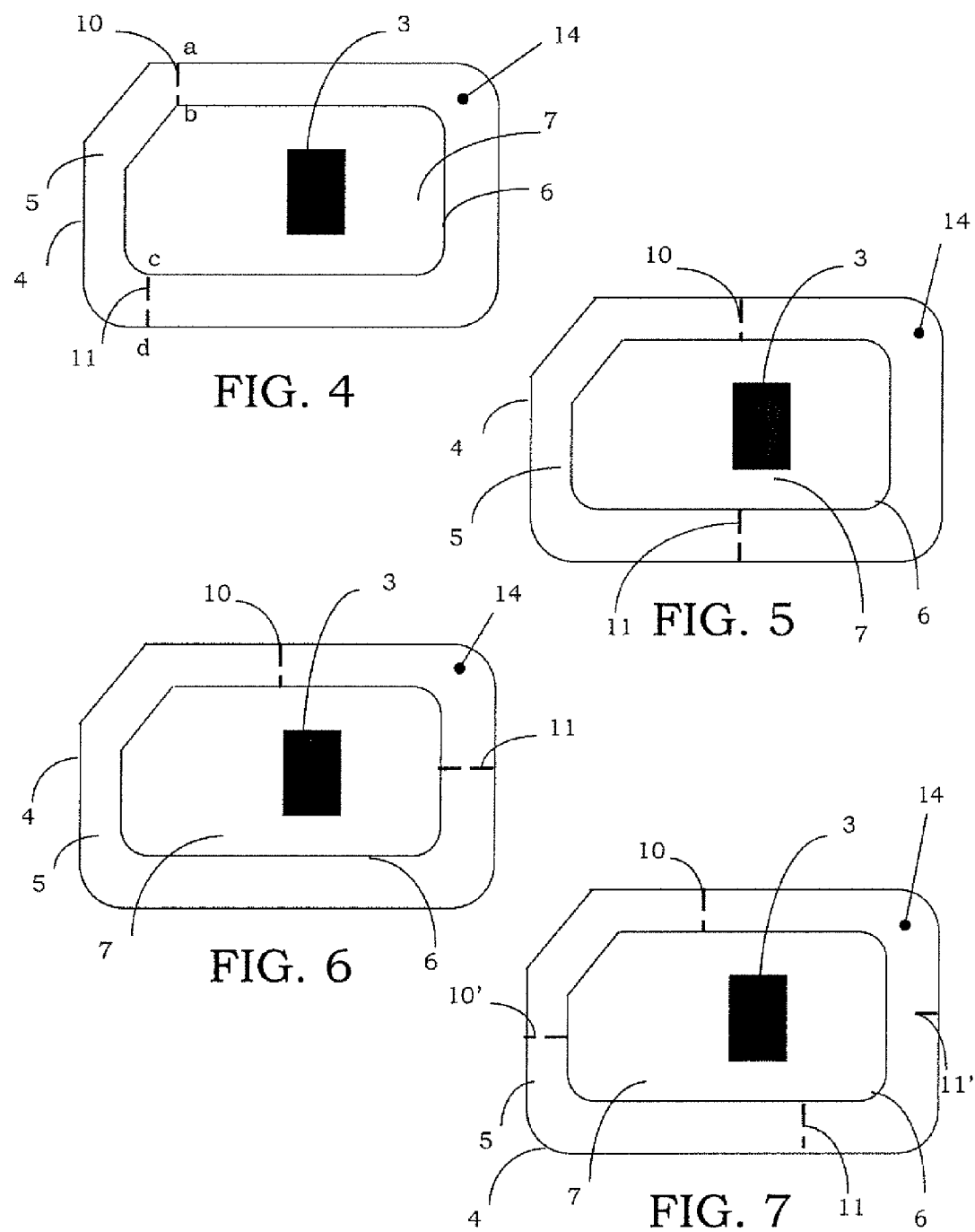

IC CARD

FIELD OF THE INVENTION

The present invention relates to integrated circuit cards, and more particularly, to an integrated circuit card comprising a substrate, a circuit incorporated in the substrate, and pre-cut lines which delimit on the substrate sectors with a same shape and size of various formats, such as 2FF, 3FF and 4FF formats.

BACKGROUND OF THE INVENTION

A smart card or integrated circuit card (ICC) is a device with the dimensions of a credit card for the safe storage of data. In particular, the integrated circuit card includes a plastic substrate which has, embedded in it, a microchip (i.e., the integrated circuit) which stores the data and provides calculation functions. The plastic substrate has a standard size and form, which is generally indicated by the term "form factor" (abbreviated FF) and a number which identifies the different formats of the cards.

Originally, the size of the integrated circuit cards was that of a credit card (Full-size Smart Card, 1FF—85.60 mm×53.98 mm×0.76 mm). Following the development of mobile devices, which are physically becoming increasingly smaller, the cards have undergone a miniaturization and re-dimensioning process. Over the years this has resulted in a reduction in the amount of the plastic substrate surrounding the integrated circuit.

The most common formats are essentially three in number and differ from each other only in terms of dimensions (length×width×depth).

Mini-SIM (2FF) 25 mm×15 mm×0.76 mm

Micro-SIM (3FF) 15 mm×12 mm×0.76 mm

Nano-SIM (4FF) 12.30 mm×8.80 mm×0.67 mm

Essentially, the integrated circuit in a particular sector of the 1FF format card forms a small-size card which may be used for specific applications. For example, in the 2FF format (ISO/IEC specification 7810:2003), the card may be used with most cellular phones. In the 3FF format (ETSI TS 102 221 V9.0.0 specification) it may be used with certain smart phones, such as the iPhone 4. In the 4FF format (ETSI TS 102 221 V11.0.0 specification) it may be used in the most recent iPhone 5.

The various formats 2FF, 3FF and 4FF are usually integrated within the substrate with a full-size or 1FF format and, by a system of pre-cuts, they may be removed from it so as to allow the end user to remove and use the format suitable for the particular receiving slot in his/her device.

Although initially such a system for incorporating several formats was considered to be an instrument useful and advantageous for the client, a technical problem was subsequently encountered, resulting in the need to reconsider the validity of the current approaches.

More specifically, this problem relates to the fact that it has become an increasingly established practice to use the various disposable frame-pieces of the various formats as an "all purpose" approach for the related card. This occurs in particular when, for example, the format 2FF is used as an adapter for the 3FF format or the format 3FF is used as an adapter for the 4FF format.

The main drawback of this practice has been identified by the manufacturers of mobile devices who, following the use of the disposable frame-pieces as adapters for a smaller format, have noted that there is a substantial deterioration of the contact slides inside the slots which are designed to receive the SIM card.

SUMMARY OF THE INVENTION

The technical problem is to avoid an integrated circuit card in which the reuse of a disposable frame-piece is hindered or prevented and, thus, the contact slides inside the slots may become damaged. The contact slides receive the integrated circuit card. This overcomes the main drawback which affects the cards designed according to the prior art.

The proposed approach is that of producing an integrated circuit card based on a full-size 1FF format substrate where all the smaller size formats formed inside it, except for the smallest format, have suitable pre-cut lines which are suitably positioned inside a disposable frame-piece and are designed to break it so that it is no longer intact, during separation of the format contained therein.

The technical problem may be addressed by an integrated circuit card comprising a substrate and an integrated circuit incorporated on the substrate. The substrate may include a first sector delimited by a first weakening line on the substrate. The first sector may be able to be separated from the substrate, and has a form and size of a first standard format. A second sector may be delimited by a second weakening line inside the first sector. The second sector may be able to be separated from the substrate and has the integrated circuit thereon. The second sector has a form and size of a second standard format having dimensions smaller than those of the first standard format. A disposable frame-piece may be defined between the first and second weakening lines of the first and second sectors, and has a ring form with a rectangular contour, with opposite sides, in pairs substantially parallel to each other. At least one breakage lug may be arranged transversely with respect to at least one of the sides of the disposable frame-piece. The at least one breakage lug may be able to break the disposable frame-piece so that it is no longer intact, during separation of the second sector from the substrate.

The substrate may have a 1FF format of integrated circuit cards. The first sector may have a 2FF format of integrated circuit cards, and the second sector may have a 3FF format of integrated circuit cards.

A method for manufacturing an integrated circuit card as described above includes forming a first sector delimited by a first weakening line on the substrate. The first sector may be able to be separated from the substrate, and may have a form and size of a first standard format. A second sector delimited by a second weakening line inside the first sector may be formed. The second sector may be able to be separated from the substrate and may have the integrated circuit thereon, and have a form and size of a second standard format having dimensions smaller than those of the first standard format. The method further includes forming a disposable frame-piece defined between the first and second weakening lines of the first and second sectors, and a ring form with a rectangular contour, with opposite sides, in pairs substantially parallel to each other. At least one breakage lug may be arranged transversely with respect to at least one of the sides of the disposable frame-piece. The at least one breakage lug may be able to break the disposable frame-piece so that it is no longer intact, during separation of the second sector from the substrate.

BRIEF DESCRIPTION OF THE DRAWINGS

Further characteristic features and advantages of the integrated-circuit card and its method of production will become clear from the description below, provided solely by way of example with reference to the accompanying drawings:

FIGS. 4 to 7 shows in diagrammatic form variations of the integrated circuit card shown in FIG. 1;

DETAILED DESCRIPTION OF THE PREFERRED EMBODIMENTS

A particular embodiment illustrated in the corresponding figure is described. However, the present invention is not limited to this particular embodiment. On the contrary, this particular embodiment clarifies different aspects, while the scope and extent thereof are defined by the claims.

Figure 1:
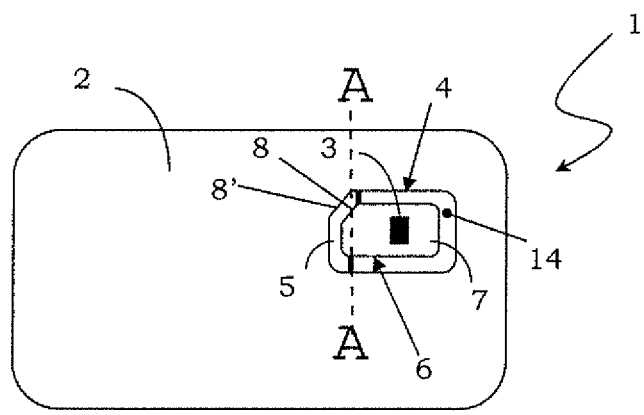
FIG. 1 shows in diagrammatic form an integrated circuit card according to the present invention.

With reference to FIG. 1, this shows in diagrammatic form an integrated circuit card 1 according comprising a substrate 2 with a 1 FF format, and a circuit 3 incorporated in the substrate 2.

The substrate 2 has, formed therein, at least a first pre-cut or weakening line 4 delimiting a first sector 5 with a form and size of a first format. In particular, the first format ay be a 2FF format of integrated circuit cards. The first sector 5 with a 2FF format comprises, in turn, a second pre-cut line 6 delimiting a second sector 7 with a form and size of a second format. The second sector has dimensions smaller than those of the first format. In particular, the dimensions may be a 3FF format of integrated circuit cards.

The pre-cut lines 4 and 6 have respective chamfered corners 8, 8' that are able to prevent an incorrect insertion of the card obtained by separation of one of these sectors 5, 7 from the substrate 2 in a device intended to receive it.

In the most recent applications, the card 1 may also comprise a third sector 9 having dimensions smaller than those of the first and second formats. The third sector 9 is formed within the second sector with a 3FF format. In particular, the third sector 9 may have a 4FF format of integrated circuit cards, as diagrammatically shown in FIG. 2. In this case, the third sector 9 with a 4FF format is also delimited by a respective third pre-cut line 9'.

Figure 2:
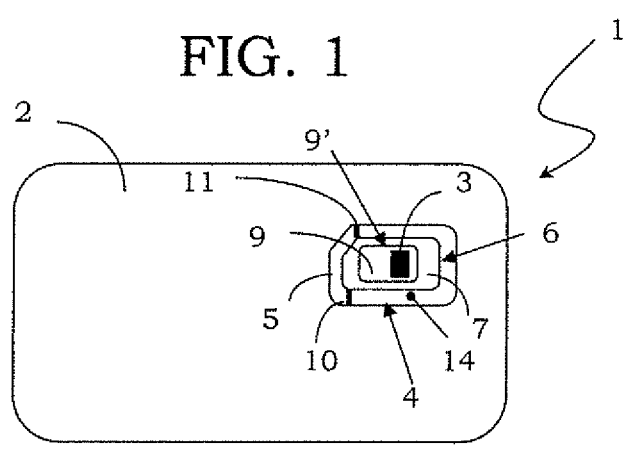
FIG. 2 shows in diagrammatic form a variation of the integrated circuit card shown in FIG. 1.

For easier illustration, and in the continuation of the description, reference will be made to the card shown in FIG. 1. The card comprises the sectors with a 2FF format and a 3FF format. This configuration is not intended to be limiting. The considerations below are also applicable to cards comprising additional sectors with additional formats. Sectors may have dimensions smaller than the 3FF format sector, such as, for example, a 4FF format sector, as shown in FIG. 2.

Figure 3:
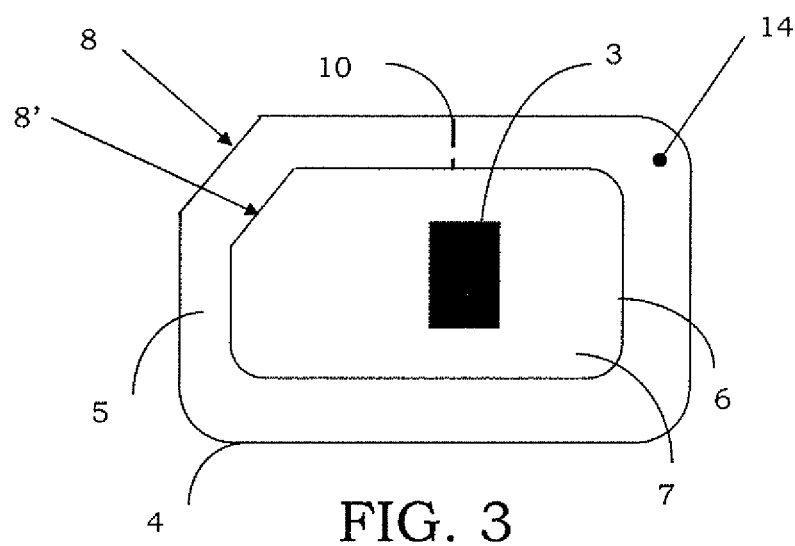
FIG. 3 shows in diagrammatic form and on a larger scale a detail of the card shown in FIG. 1.

With reference to the larger-scale view of FIG. 3, it is emphasized that the first pre-cut line 4 of the first sector 5 with a 2FF format is provided so as to be wider or formed by a greater number of cuts than the second pre-cut line 6 of the second sector 7 with a 3FF format. In this way, in fact, following the application of a force on the substrate 2 intended to separate a given sector from the card 1, the separation of the second sector 7 from the substrate 2 occurs before the separation of the first sector 5 from the substrate 2. In this way, it is possible to separate the second sector 7 from the first sector 5, only after the first sector 5 has already been separated from the card 1. The first sector 5 includes the second sector 7 and the circuit 3.

The first pre-cut line 4 is essentially configured so as to facilitate separation of the first sector 5 from the substrate 2. Similarly, the second pre-cut line 6 allows detachment of the second sector 7 from the first sector 5.

Alternatively, the first sector 5 is defined by a shearing die which forms a proper cut line 4 around the first sector 5. In this case, preferably, the second pre-cut line 6 and optionally the third pre-cut line 9' pass through only part of the substrate 2. This is while the cut line 4 passes through the whole substrate, so as to form an aperture from one side to the other of the card 1.

With reference to the detail shown in FIG. 3, at least one breakage lug 10 is formed between the first pre-cut line 4 and the second pre-cut line 6, along a disposable frame-piece 14 defined by the second sector 7 inside the first sector 5. The breakage lug is designed to break the disposable frame-piece 14 so that it is no longer intact, and make it difficult to reuse, as diagrammatically illustrated in FIG. 3.

The disposable frame-piece 14 has a substantially annular or ring shape with a substantially rectangular contour. The annular or ring shape has oppositely arranged sides, in pairs substantially parallel to each other. The breakage lug 10 is substantially transverse to at least one of the sides of the disposable frame-piece 14.

As illustrated in FIG. 4, the disposable frame-piece 14 has, defined therein, two breakage lugs, indicated by 10 and 11. The two breakage lugs 10, 11 are designed to separate the disposable frame-piece 14 into at least two separate portions so as to totally prevent reuse thereof. A first breakage lug 10 extends from 'a' and 'b'. These letters are used to indicate the joining points of the first breakage lug 10 with the first pre-cut line 4 and with the second pre-cut line 6, respectively.

A second breakage lug 11 extends similarly from 'c' to 'd'. These join points of the second breakage lug 11 with the second pre-cut line 6 and with the pre-cut line 4, respectively.

In the example shown in FIG. 4, the first breakage lug 10 and the second breakage lug 11 are perpendicular to the pre-cut lines 4, 6 and are arranged transversely with respect to a pair of perpendicular sides of the disposable frame-piece 14.

The aforementioned choice of the joining points 'a', 'b', 'c' and 'd' shown in FIG. 4 is not random, but is determined by the fact that, in this way, the breakage points 10 and 11 are positioned in respective portions of the disposable frame-piece 14 situated far from the circuit 3. It is thus avoided that the stress resulting from breakage of these breakage lugs may accidentally damage the circuit 3.

In a further embodiment, these breakage lugs 10 and 11 may be positioned in a symmetrical and opposite manner on facing and parallel sides of the disposable frame-piece 14, as shown in FIG. 5.

Alternatively, these breakage lugs 10, 11 may be positioned asymmetrically on mutually perpendicular sides of the disposable frame-piece 14 (as shown in FIG. 6). Reference is made to only two breakage lugs. This is not intended to be limiting. In fact, it is possible to provide an integrated circuit card which has three or more breakage points in it. An example of such a card comprising four breakage lugs 10, 10', 11, 11' arranged transversely on all sides of the disposable frame-piece 14 is shown in FIG. 7.

A method for manufacturing the card 1 comprising the pre-cut lines and the breakage lugs will now be described. The method for the manufacture of an integrated circuit card 1 comprises a preliminary step of providing a substrate 2. The substrate 2 may be made out of plastic, for example, and incorporates or carries an integrated circuit 3.

The method involves furthermore defining in the substrate 2 a first sector 5 having a form and size equivalent to a first format, and at least one second sector 7 having a form and size equivalent to a second format. The second format has dimensions smaller than the first format, and is therefore arranged inside the first sector 5. These sectors are intended to be separated from the card 1, and are delimited by respective cuts and/or pre-cut lines.

Conveniently, the method also comprises at least one step of providing in the disposable frame-piece 14 at least one breakage lug 10 which is designed to break the disposable frame-piece 14 so that it is no longer intact. This is done during separation of the second sector 7 inside the first sector 5.

More particularly, with reference to the example in FIG. 4, the method comprises the following steps. The first pre-cut or weakening line 4 is formed, optionally a cut line, in the substrate 2. This defines the first sector 5 of the substrate 2, which is designed to be separated from the card 1. The first sector 5 has the same size as a 3FF format of integrated circuit cards.

At least one second pre-cut or weakening line 6 defining a second sector 7 within the first sector 5 is formed. The second sector 7 includes the integrated circuit 3, and is designed to be separated from the card 1. The second sector 7 has the same size as a 2FF format of integrated circuit cards.

The method also comprises the step of providing at least one breakage lug 10 in a disposable frame-piece 14 defined between the first and second pre-cut or weakening lines 4, 6. The breakage lug 10 is designed to break this disposable frame-piece 14 so that it is no longer intact, during separation of the second sector 7, inside the first sector 5.

More particularly, the method involves providing at least two breakage lugs 10, 11 which are designed to separate the disposable frame-piece 14 into at least two separate portions.

The breakage lugs may be formed with the same number of cuts as the second pre-cut line 6. It is thus ensured that the breakage lugs have the same flexural strength as the second pre-cut line 6. In this way, during removal of the first sector 5 from the substrate 2, accidental breakage of the disposable frame-piece 14 included in it is avoided.

The breakage lugs may be formed in the substrate 2 by an incision which leaves intact only a small portion of the same substrate 2. This small portion of the substrate 2 will subsequently be broken by pressure exerted by the user during separation of the second sector 7 from the first sector 5.

The incision starts from one side of the substrate 2 and stops before it reaches an opposite side thereof. The remainder of the substrate is not affected by the cutting action. In fact, providing the force necessary for breaking the breakage lug is calibrated so as to be greater than the force necessary for separation of the first sector 5.

Figure 8:
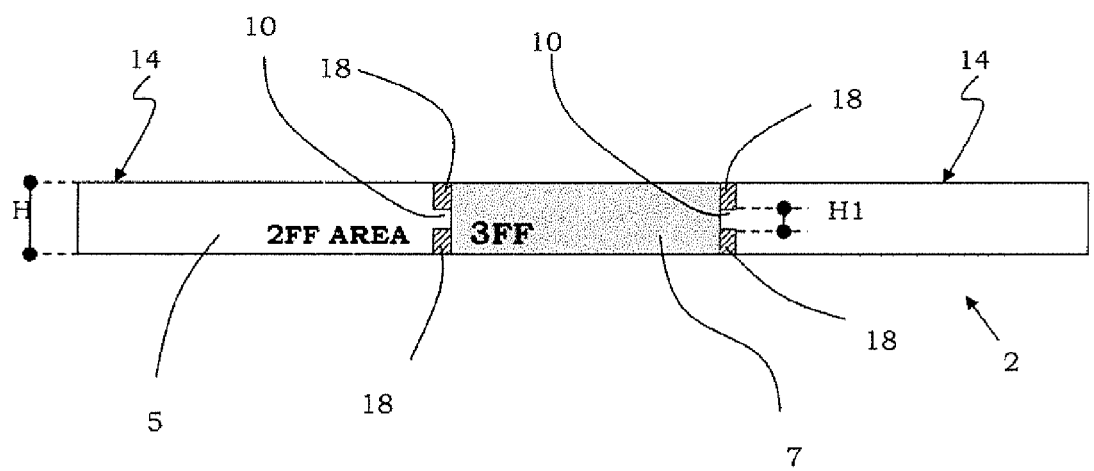
FIG. 8 shows in greater detail a cross-sectional view of the integrated circuit card shown in FIG. 1.

FIG. 8 is a partial side view (cross-section A-A) of the integrated circuit card 1 according to FIG. 1 showing only the first sector 5 with a 2FF format and the second sector 7 with a 3FF format. Two breakage lugs 10 are formed in the disposable frame-piece 14 defined between the cuts or pre-cut lines (not shown) of the first sector 5 and the second sector 7.

This example is not intended to limit the number of breakage lugs 10 or their arrangement on the disposable frame-piece 14. This example is to show that the two lugs 10 are transverse to the long side of the first and second sectors, and are substantially aligned. For each lug 10, two oppositely arranged incisions 18 are defined on opposite surfaces of the substrate 2. This leaves a bridge of material between the first sector 5 and the second sector 7.

The depth H1 of the incisions 18 constitutes between 10% and 90% of the thickness H of the substrate 2. For example, the depth H1 is equal to the ⅓rd of the depth H of the substrate 2, and the bridge of material has a thickness substantially equal to ⅓rd of the thickness H.

Alternatively, the breakage lugs are formed by an incision in the form of a discontinuous bore in the substrate 2 to create a sequence of through-sections joined by small bridges of material.

By way of conclusion, an integrated circuit card is formed where different sectors with different formats. The sectors are delimited by suitable cuts and/or pre-cut lines, and are provided with breakage lugs which are suitably positioned in a disposable frame-piece. The breakage lugs are between sectors with different formats and are designed to break the frame-piece so that it is no longer intact, during separation of the smallest format contained in this frame-piece.

Advantageously, the illustrated card is able to hinder or prevent the disposable frame-piece from being reused in any way, thus preventing damage to the contact slides inside the slots designed to receive the SIM card.

The invention claimed is:

1. An integrated circuit card comprising:
a substrate and an integrated circuit incorporated on the substrate, said substrate comprising
a first sector delimited by a first weakening line on said substrate, said first sector being separable from said substrate, and having a form and size of a first format,
a second sector delimited by a second weakening line inside said first sector, said second sector being separable from said substrate and having said integrated circuit thereon, and having a form and size of a second format having dimensions smaller than dimensions of the first format,
a disposable frame-piece defined between the first and second weakening lines of said first and second sectors, and having a ring form with a rectangular contour, with opposite sides, in pairs substantially parallel to each other, and
at least one breakage lug arranged transversely with respect to at least one of the sides of said disposable frame-piece to break said disposable frame-piece so that said disposable frame-piece is no longer intact, during separation of said second sector from said substrate.

2. The integrated circuit card according to claim 1, wherein said at least one breakage lug comprises at least two breakage lugs to separate said disposable frame-piece into at least two different portions.

3. The integrated circuit card according to claim 2, wherein said at least two breakage lugs are arranged on two different sides of said disposable frame-piece.

4. The integrated circuit card according to claim 1, wherein said at least one breakage lug is defined by a cut in said substrate which does not pass through an entire thickness of said substrate.

5. The integrated circuit card according to claim 4, wherein the cut is at least one of continuous and discontinuous incisions.

6. The integrated circuit card according to claim 4, wherein the cut is a discontinuous bore in said substrate defining a sequence of through-sections joined together by bridges of material.

7. The integrated circuit card according to claim 1, wherein said at least one breakage lug comprises more than two breakage lugs.

8. The integrated circuit card according to claim 1, wherein said substrate has a 1FF format of integrated circuit cards.

9. The integrated circuit card according to claim 1, wherein said first sector has a 2FF format of integrated circuit cards and said second sector has a 3FF format of integrated circuit cards.

10. The integrated circuit card according to claim 1, wherein said second weakening line has a same number of cuts as said at least one breakage lug.

11. An integrated circuit card comprising:
   a substrate and an integrated circuit on the substrate, said substrate comprising
      a first sector delimited by a first weakening line on said substrate, said first sector being separable from said substrate,
      a second sector delimited by a second weakening line inside said first sector, said second sector being separable from said substrate and having said integrated circuit thereon, and having dimensions smaller than dimensions of said first sector,
      a disposable frame-piece defined between the first and second weakening lines of said first and second sectors, and having a ring form with a rectangular contour, and
      at least one breakage lug arranged with respect to said disposable frame-piece to break said disposable frame-piece so that said disposable frame-piece is no longer intact, during separation of said second sector from said substrate.

12. The integrated circuit card according to claim 11, wherein said at least one breakage lug comprises at least two breakage lugs to separate said disposable frame-piece into at least two different portions.

13. The integrated circuit card according to claim 12, wherein said ring has a rectangular contour, and wherein said at least two breakage lugs are arranged on two different sides of said disposable frame-piece.

14. The integrated circuit card according to claim 11, wherein said at least one breakage lug is defined by a cut in said substrate which does not pass through an entire thickness of said substrate.

15. The integrated circuit card according to claim 11, wherein said substrate has a 1FF format of integrated circuit cards.

16. The integrated circuit card according to claim 11, wherein said first sector has a 2FF format of integrated circuit cards and said second sector has a 3FF format of integrated circuit cards.

17. A method for manufacturing an integrated circuit card comprising a substrate and an integrated circuit incorporated in the substrate, the method comprising:
   forming a first sector delimited by a first weakening line on the substrate, the first sector being separable from the substrate, and having a form and size of a first format;
   forming a second sector delimited by a second weakening line inside the first sector, the second sector being separable from the substrate and having the integrated circuit thereon, and having a form and size of a second format having dimensions smaller than dimensions of the first format;
   forming a disposable frame-piece defined between the first and second weakening lines of the first and second sectors, and having a ring form with a rectangular contour, with opposite sides, in pairs substantially parallel to each other; and
   forming at least one breakage lug arranged transversely with respect to at least one of the sides of the disposable frame-piece to break the disposable frame-piece so that the disposable frame-piece is no longer intact, during separation of the second sector from the substrate.

18. The method according to claim 17, wherein providing at least one breakage lug in the disposable frame-piece comprises providing at least two breakage lugs in different positions of the disposable frame-piece to separate the disposable frame-piece into at least two different portions during separation of the second sector inside the first sector.

19. The method according to claim 18, wherein the at least two breakage lugs are arranged on two different sides of the disposable frame-piece.

20. The method according to claim 17, wherein the at least one breakage lug is defined by a cut in the substrate which does not pass through an entire thickness of the substrate.

21. The method according to claim 17, wherein the substrate has a 1FF format of integrated circuit cards.

22. The method according to claim 17, wherein the first sector has a 2FF format of integrated circuit cards and the second sector has a 3FF format of integrated circuit cards.

* * * * *